United States Patent [19]

Ohkubo

[11] Patent Number: 4,721,014
[45] Date of Patent: Jan. 26, 1988

[54] PLANETARY CARRIER FOR PLANETARY GEAR TRANSMISSION

[75] Inventor: Masahiro Ohkubo, Osaka, Japan

[73] Assignee: Kabushiki Kaisha Daikin Seisakusho, Osaka, Japan

[21] Appl. No.: 929,470

[22] Filed: Nov. 12, 1986

[30] Foreign Application Priority Data

Nov. 11, 1985 [JP] Japan .................... 60-252554

[51] Int. Cl.$^4$ .................... F16H 3/44; F16H 57/10
[52] U.S. Cl. .................... 74/750 R; 74/768; 74/785
[58] Field of Search .................... 74/785, 768, 750 R

[56] References Cited

U.S. PATENT DOCUMENTS

| | | | |
|---|---|---|---|
| 2,624,215 | 1/1953 | McRae | 74/768 X |
| 2,868,037 | 1/1959 | Hindmarch | 74/785 |
| 3,780,601 | 12/1973 | Dach et al. | 74/750 R X |
| 4,043,021 | 8/1977 | Mosbacher et al. | 74/750 R X |
| 4,468,985 | 9/1984 | Nilsson | 74/785 X |
| 4,480,492 | 11/1984 | Fujioka et al. | 74/750 R X |

FOREIGN PATENT DOCUMENTS 460830 10/1913 France .................... 74/785
60-25906 8/1986 Japan .

Primary Examiner—Dirk Wright
Attorney, Agent, or Firm—Armstrong, Nikaido, Marmelstein & Kubovcik

[57] ABSTRACT

In a planetary gear transmission having a planetary gear train wherein first and second planetary gears meshing each other are carried by a common planetary carrier and the both planetary gears are meshed with separate sun gear and ring gear respectively; a planetary carrier for a planetary gear transmission, in which said planetary carrier is divided into two plate members facing each other, a boss carrying either of the both planetary gears is provided on one of the plate members, the two plate members are fastened together by the boss and a connection member which passes through the planetary gear carried by the boss, and bearing holes carrying the other planetary gear are made on the fastened plate members.

8 Claims, 7 Drawing Figures

4,721,014

PLANETARY CARRIER FOR PLANETARY GEAR TRANSMISSION

BACKGROUND OF THE INVENTION

1. Industrial Useful Field

This invention relates, for example, to a planetary carrier for a planetary gear transmission employed in an automatic transmission for automobile.

2. Prior Art and its Problem

As shown in FIG. 6, a planetary carrier 100 for conventional Ravineaux type planetary gear transmission, for example, is a solid cast or forged article and connection parts 102 are provided in this planetary carrier 100 at circumferential plural places.

Incidentally, the applicant of this invention has invented a combination of a torque converter having an four-element impeller and a partly improved Ravineaux type planetary gear train, and has applied it for a patent (Japanese Patent Application Ser. No. 60-25906, U.S. patent application Ser. No. 826,039, German Patent Application Ser. No. P 36 04 393 Al).

In this prior art, first and second planetary gears are carried by a planetary carrier and are meshed with separate sun gear (inner peripheral side) and ring gear (outer peripheral side) respectively.

Therefore, when the planetary carrier 100 as shown in FIG. 6 is employed in such a prior art, a diameter of the planetary carrier 100 must be enlarged in order to avoid an interference between the connection parts 102 and the both planetary gears. Consequently, diameters of the sun gear and the ring gear must naturally be enlarged to cause an increase in the overall size of the planetary gear train.

Object of the Invention

An object of the present invention is to provide a planetary carrier for a planetary gear transmission, wherein first and second planetary gears are carried by a planetary carrier to minimize a size of a planetary carrier for use in a planetary gear train meshed with separate sun gear and ring gear respectively, thus the overall size of the planetary gear transmission can be minimized.

Composition of the Invention (1) Technical measure

In a planetary gear transmission having a planetary gear train wherein first and second planetary gears meshing each other are carried by a common planetary carrier and the both planetary gears are meshed with separate sun gear and ring gear respectively; a planetary carrier for a planetary gear transmission, in which said planetary carrier is divided into two plate members facing each other, a boss carrying either of the both planetary gears is provided on one of the plate members, the two plate members are fastened together by the boss and a connection member which passes through the planetary gear carried by the boss, and bearing holes carrying the other planetary gear are made on the both fastened plate members.

(2) Effect

The planetary carrier is divided into two plate members which are fastened by the connection member, so that the diameter of the planetary carrier can be minimized.

DETAILED DESCRIPTION OF THE INVENTION (Embodiment)

Figure 1:
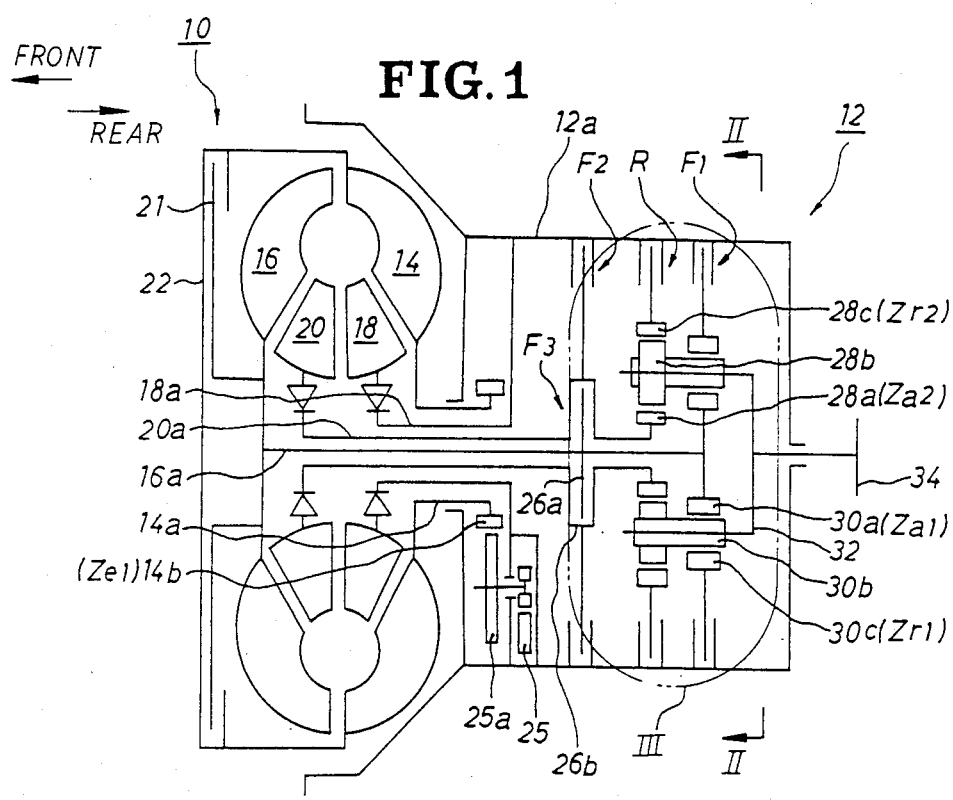
FIG. 1 is a schematic structural vertical sectional view of an automatic transmission according to the present invention.

In FIG. 1 showing an embodiment as applied to an automatic transmission for a commercial vehicle such as a track etc. for example, 10 is a four-element and two-stage type torque converter. A transmission 12 of forward three speeds and backward one speed is coupled to a rear stage of the torque converter. The transmission 12 includes a planetary gear train comprising a first planetary gear 30b and a second planetary gear 28b which have one planetary carrier 32 in common, a clutch F3 and brakes F1, F3 and R which control the planetary gear train.

The automatic transmission is composed of said transmission 12, the torque converter 10 and a hydraulic changespeed stage control unit which will be described later in details.

The torque converter 10 consists of a pump 14, a turbine 16, a fixed stator 18, a reversing stator 20 and a lock-up clutch 21, and is so constructed that a power from engine is transmitted from a front cover 22 to the pump 14.

The turbine 16 is coupled to a turbine shaft 16a, and the reversing stator 20 is coupled to a stator shaft 20a. The fixed stator 18 is fixed to a housing 12a by a shaft 18a, and the pump 14 is coupled to a pump shaft 14a. A ring gear 14b is provided at a transmission side end of the pump shaft 14a, and a tooth number of the ring gear 14b is set to Zel.

A charging pump 25, which is a hydraulic power source, is installed at a lower part of the housing 12a and the charging pump 25 is so designed as to be driven by a driving gear 25a meshing with said ring gear 14b.

A clutch disc 26a of a clutch F3 for third gear is fixed in the midway of the turbine shaft 16a. A clutch cover 26b for the clutch F3 is connected to the stator shaft 20a. A brake F2 for second gear is disposed at an outside of the clutch cover 26b, and the brake F2 is fixed to the housing 12a.

A second sun gear 28a (tooth number: Za2) is fixed at an end of the stator shaft 20a, and a first sun gear 30a (tooth number: Za1) is fixed at an end of the turbine shaft 16a. The first sun gear 30a meshes with a first planetary gear 30b and the second sun gear 28a meshes with a second planetary gear 28b.

A first ring gear 30c (tooth number Zr1) is installed at an external side of the first planetary gear 30b, and the first ring gear 30c meshes with the first planetary gear 30b. A brake F1 for first gear fixed to the housing 12a is disposed at a further external side of the first ring gear 30c.

A second ring gear 28c (tooth number: Zr2) meshes with the second planetary gear 28b at its external side, and a brake R for reverse gear is disposed at a further external side of the second ring gear 28c. The brake R is fixed to the housing 12a.

Figure 2:
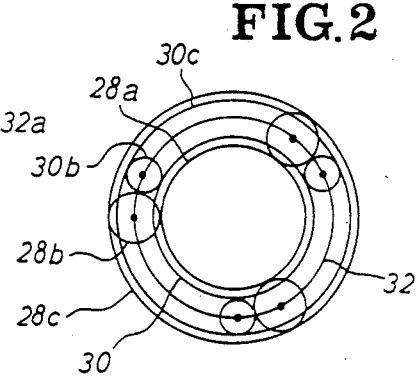
FIG. 2 is a sectional view taken on a line II—II of FIG. 1.

As shown in FIG. 2, the first planetary gear 30b and the second planetary gear 28b are held on a carrier 32 in such a way that they mesh each other and can rotate freely.

An output shaft 34 is connected to the carrier 32.

By selectively actuating the clutch F3 and the brakes F1, F2 and R, the foregoing transmission 12 is able to develop reduction ratios as tabulated in the following Table 1. Incidentally, 0 mark in the table indicates actuating state of respective clutch or/brake.

TABLE 1

| Gear position | F1 | F2 | F3 | R | Reduction ratio |
|---|---|---|---|---|---|
| Forward gears | | | | | |
| 1st gear | O | | O | | $\frac{Za1 + Zr1}{Za1} > 2$ |
| 2nd gear | | O | O | | $2 > \frac{Za1 + Za2}{Za1} > 1$ |
| 3rd gear | | | O | | 1 |
| Reverse gear | | | | O | $-\frac{Zr2 + Za1}{Za1}$ |

A detailed construction of the planetary gear train for the transmission 12 will be described hereunder with reference to FIG. 3.

Figure 3:
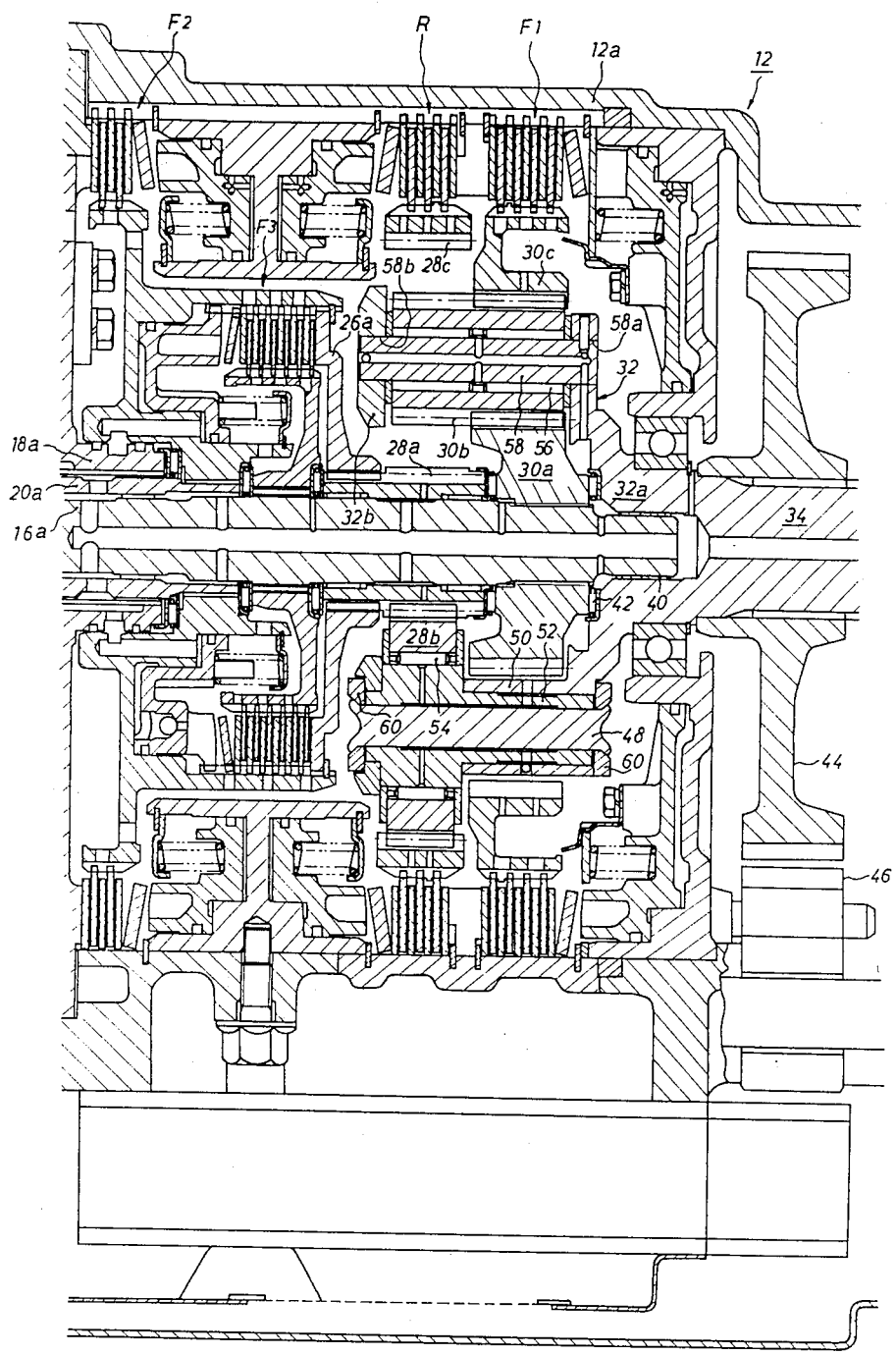
FIG. 3 is an enlarged view of a part III of FIG. 1.

In FIG. 3, the second sun gear 28a is interconnected to the forwardly extending stator shaft 20a through the clutch cover 26a of the clutch F3. Further, the first sun gear 30a spline fits onto the turbine shaft 16a disposed at an internal side of the stator shaft 20a. Moreover, a rear end of the turbine shaft 16a is carried through a needle bearing 40 by a first plate member 32a of the planetary carrier 32. A thurst needle bearing 42 is interposed between the first plate member 32a and the first sun gear 30a.

A rear end of the first plate member 32a connects solidly to an output shaft 34, and a parking gear 44 for use in parking spline fits onto the output shaft 34. A locking arm 46 for locking the parking gear 44 is installed at a lower part of the parking gear 44.

The first plate member 32a is formed into an approximately disc-like shape as described later in details, and the first plate member 32a, which is fastened to a second plate member 32b facing on the first plate member 32a by a rivet 48 (connection member), composes the planetary carrier 32.

Bosses 50 are formed integrally and consecutively at three places, for example, on the first plate member 32a with equal distances left therebetween in a large circumferential direction. A stepped cylindrical shaft 52 having a large diameter portion is press fit in the boss 50 and said second planetary gear 28b is carried by the large diameter portion of cylindrical shaft 52 through a needle bearing 54. The large diameter portion of shaft 52 also spaces the second plate member 32b from the first plate member 32a while maintaining clearance for a pair of washers and rotary movement of the second planetary gear 28b. The second planetary gear 28b meshes with the second sun gear 28a.

The second ring gear 28c meshes with the second planetary gear 28b at its external side, and said brake R is disposed at a further external side of the second ring gear 28c.

The first planetary gear 30b meshing with the second planetary gear 28b is carried by the planetary carrier 32. This first planetary gear 30b is carried by a shaft 58 through a needle bearing 56, and the shaft 58 is press fit into bearing holes 58a and 58b of the both plate members 32a and 32b.

The first planetary gear 30b meshes with the internal first sun gear 30a and the external first ring gear 30c, and the brake F1 is installed at a further external side of the first ring gear 30c.

Details of the above-mentioned planetary carrier 32 will be described hereunder with reference to FIG. 4 and FIG. 5.

The first plate member 32a forms a forged disc-like shape for example, and the segmentary boss 50 is formed at a front end face of the first plate member 32a. The boss 50 is provided at three places with equal distances left therebetween in the circumferential direction. Both ends of the rivet 48 penetrating the boss 50 and the cylindrical shaft 52 are fastened by "crimping work" to the both plate members 32a and 32b in such a way that the rivet pinches washers 60.

The second plate member 32b is formed into an approximately annular shape facing on the first plate member 32a. The first planetary gear 30b, which is carried by the shaft 58 press fit in the bearing holes 58a and 58b of the both plate members 32a and 32b, is disposed in the vicinity of the second planetary gear 28b and meshes with the both planetary gears 28b and 30b, as illustrated in FIG. 5.

Figure 5:
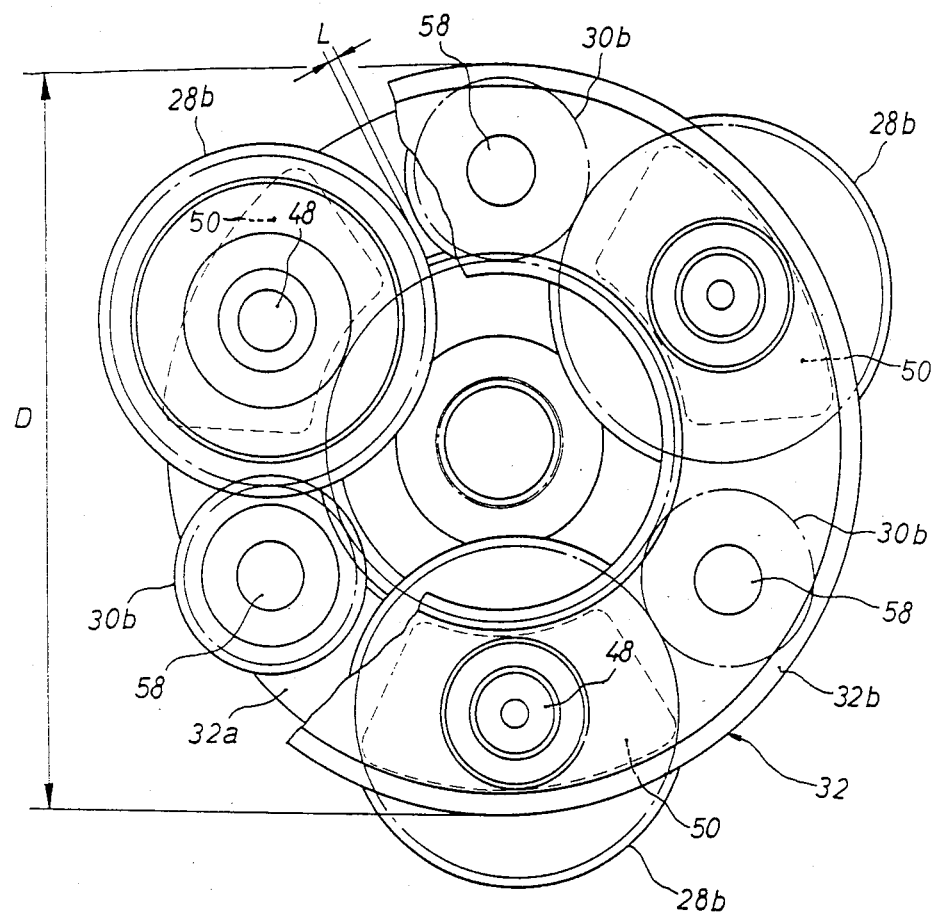
FIG. 5 is a view viewed in an arrow V of FIG. 4.

A clearance L of FIG. 5 between the both planetary gears 28b and 30b of three sets and meshing each other, is set to a minimum possible limit value and an outside diameter D of the planetary carrier 32 is also set to a minimum value.

Function will be described hereunder. The above-mentioned planetary carrier 32 is divided into two pieces of the both plate members 32b which are connected solidly by the rivet 48 under the state that the second planetary gear 28b ais carried by the boss 50 and the first planetary gear 30b is carried by the bearing holes 58a and 58b.

Figure 6:
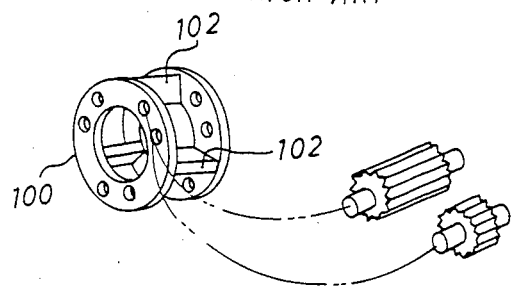
FIG. 6 is an oblique view of a conventional invention.

Since the connection part 102 can be eliminated as compared with the conventional integral type planetary carrier 100 (FIG. 6), it becomes unnecessary to dispose the connection part 102 in the clearance L of FIG. 5 so that the clearance L can be minimized. When the clearance L becomes small, the diameter D of the planetary carrier 32 also becomes small so that the overall size of the transmission 12 can be minimized.

(Effect of the invention)

As described above, in the planetary carrier of the planetary gear transmission according to the present invention, the both plate members 32a and 32b can be connected by the rivet 48 under the state that the both planetary gears 28b and 30b are carried by the both plate members 32a and 32b with the both gears meshed each other, wherein the second planetary gear 28b is carried by the boss 50 of the first plate member 32a and the first planetary gear 30b is carried by the bearing holes 58a and 58b.

Therefore, it becomes unnecessary to dispose the connection part 102 in the clearance L of FIG. 5 as compared with the conventional integral type planetary carrier 100 (FIG. 6), so that the clearance L can be set to a minimum value. For this reason, the diameter D of the planetary carrier 32 can be set to a minimum value and the overall dimension of the transmission 12 incorporating the planetary carrier 32 can be minimized.

(Another embodiment)

Figure 4A:
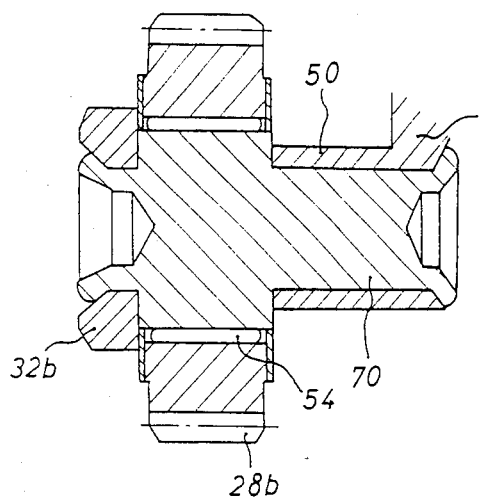
FIG. 4a is a vertical sectional view showing another embodiment of a connection member.
Figure 4:
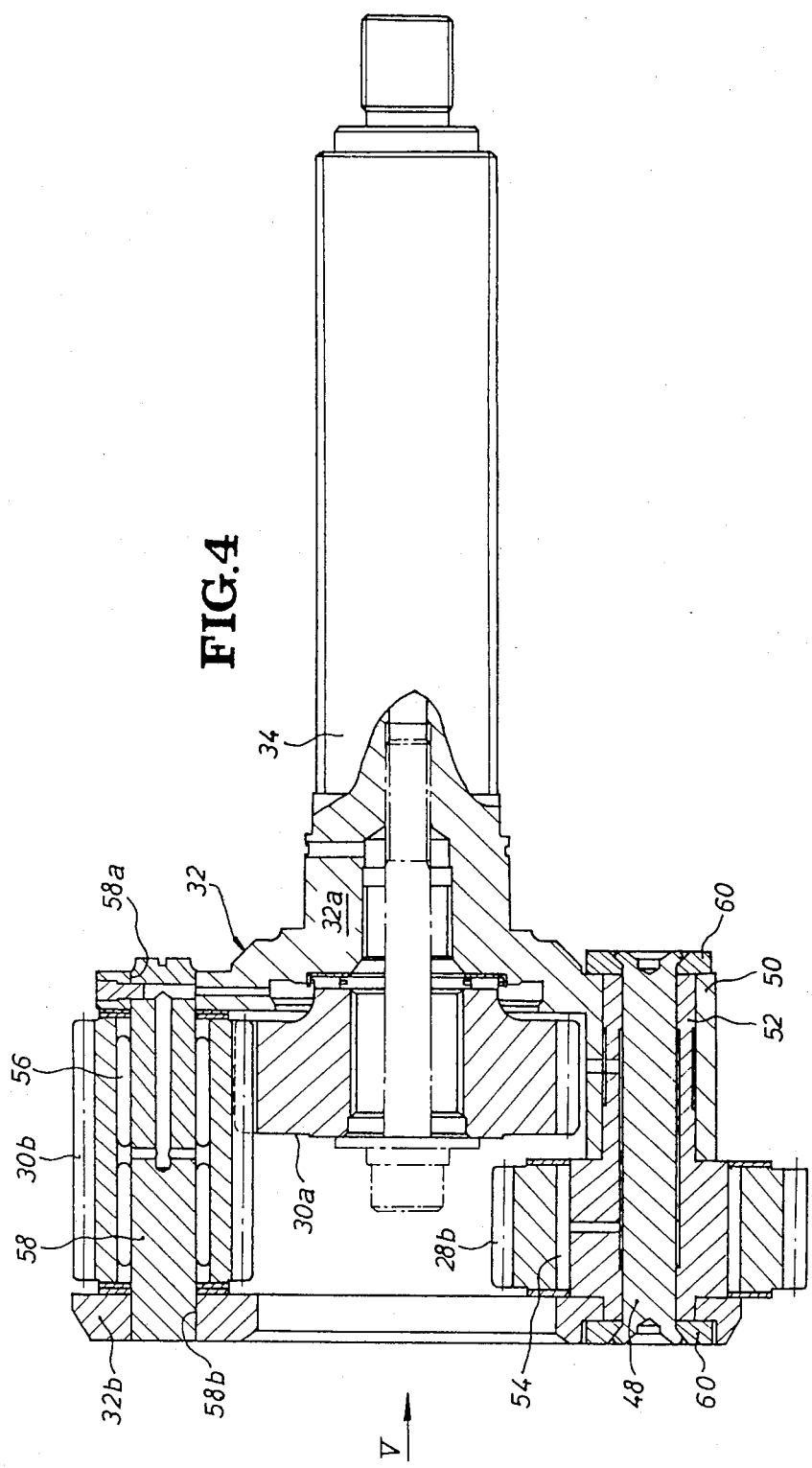
FIG. 4 is a vertical sectional view of a planetary carrier.

(1) Utilizing a shaft 70 carrying the second planetary gear 28b as the connection member, the both plate members 32a and 32b may also be connected by fastening the shaft 70 through "crimping work" as illustrated in FIG. 4a.

(2) The both plate members 32a and 32b are not necessarily formed into the approximately disc-like shape and the approximately annular shape, but may be formed at least into plate-like shapes which face one another.

What is claimed is:

1. In a planetary gear transmission having a planetary gear train wherein first and second planetary gears meshing with each other are carried by a common planetary carrier and both planetary gears are meshed with separate sun gears and ring gears respectively; a planetary carrier for a planetary gear transmission, in which said planetary carrier is divided into plate members facing each other, a plurality of bosses are provided on one of the plate members, said two plate members are fastened together by connecting means provided internally of said bosses, said connecting means includes a stepped cylindrical member having a large diameter portion spacing said plate members apart and rotatably mounting one of said planetary gears, and bearing holes carrying a shaft mounting the other planetary gear are provided to both of said fastened plate members.

2. A planetary carrier for a planetary gear transmission as set forth in claim 1, in which said connecting means includes a rivet provided in a bore of a stepped cylindrical shaft rotatably mounting said one planetary gear.

3. A planetary carrier for a planetary gear transmission as set forth in claim 1, in which said first and second planetary gears have different diameters, and said second planetary gear has a larger diameter than said first planetary gear and is carried by said large diameter portion of said stepped cylindrical member.

4. A planetary carrier for a planetary gear transmission as set forth in claim 2, in which the other plate member fits onto said stepped cylindrical shaft and said rivet is fastened to said other plate member through a washer.

5. A planetary carrier for a planetary gear transmission as set forth in claim 3, in which said first planetary gear is disposed in the vicinity of said second planetary gear having a larger diameter in such a way that they mesh each other, and said first planetary gear is carried by said shaft between said bearing holes provided to both of said plate members.

6. A planetary carrier for a planetary gear transmission as set forth in claim 1, in which plural sets of said first and second planetary gears meshing each other are disposed with equal distances left therebetween in a circumferential direction of said planetary carrier and the distance in the circumferential direction between said sets of planetary gears is set to a minimum value.

7. A planetary carrier for a planetary gear transmission as set forth in claim 1, in which the ends of said stepped cylindrical member rotatably mounting said one planetary gear are turned over by crimping work to fasten said two plate members together.

8. In a planetary gear transmission having a planetary gear train wherein first and second planetary gears having different diameters and meshing with each other are carried by a common planetary carrier and both planetary gears are meshed with separate sun gears and ring gears respectively; a planetary carrier for a planetary gear transmission, in which said planetary carrier is divided into two plate members facing each other, a plurality of bosses provided on one of said plate members, said two plate members are fastened together by connecting means provided internally of said bosses, said connecting means including a rivet provided in a bore of a stepped cylindrical shaft having a large diameter portion spacing said plate members apart and rotatably mounting one of said second planetary gears, the other plate member fits onto said stepped cylindrical shaft and said rivet is fastened to the other plate member through a washer, a first planetary gear having a smaller diameter than said second planetary gear is disposed in the vicinity of said second planetary gear in such a way that they mesh each other, said first planetary gear is carried by a shaft interposed between bearing holes provided to both of said plate members, three sets of said first and second planetary gears meshing with each other are disposed with equal distances left therebetween in a circumferential direction of said planetary carrier, the distance in the circumferential direction between the sets of planetary gears is set to a minimum value, and an output shaft for the planetary gear transmission is formed integrally with said one plate member.

* * * * *